(12) United States Patent
Leung et al.

(10) Patent No.: US 6,626,161 B2
(45) Date of Patent: Sep. 30, 2003

(54) METHODS AND ASSEMBLIES FOR DELIVERING FUEL AND GAS IN AIR ASSIST FUEL INJECTION SYSTEMS

(75) Inventors: Johnny Leung, Newport News, VA (US); Daryl Oran Codling, Gloucester, VA (US)

(73) Assignee: Synerject, LLC, Newport News, VA (US)

( * ) Notice: Subject to any disclaimer, the term of this patent is extended or adjusted under 35 U.S.C. 154(b) by 0 days.

(21) Appl. No.: 10/013,369

(22) Filed: Dec. 13, 2001

(65) Prior Publication Data

US 2003/0111064 A1 Jun. 19, 2003

(51) Int. Cl.$^7$ ............................................... F02M 51/00
(52) U.S. Cl. ...................................... 123/533; 123/457
(58) Field of Search ................................. 123/531, 533, 123/585, 590, 457

(56) References Cited

U.S. PATENT DOCUMENTS

| | | | |
|---|---|---|---|
| 3,241,805 A | 3/1966 | Schumann | |
| 3,789,819 A | 2/1974 | Moulds | |
| 4,161,964 A | 7/1979 | Greiner et al. | |
| 4,475,486 A | 10/1984 | Kessler | |
| 4,674,462 A | 6/1987 | Koch et al. | |
| 4,693,223 A | 9/1987 | Eshleman et al. | |
| 4,756,289 A | 7/1988 | Rock et al. | |
| 4,840,163 A | * 6/1989 | Alsobrooks et al. | ........ 123/533 |
| 4,934,329 A | 6/1990 | Lear et al. | |
| 4,991,556 A | 2/1991 | Mahnke et al. | |
| 5,024,202 A | 6/1991 | McKay | |
| 5,070,844 A | 12/1991 | Daly | |
| 5,094,211 A | 3/1992 | Mahnke et al. | |
| 5,101,800 A | 4/1992 | Schumann et al. | |
| 5,123,399 A | 6/1992 | Motoyama et al. | |
| 5,131,375 A | * 7/1992 | Sakamoto et al. | .......... 123/533 |
| 5,156,133 A | * 10/1992 | Sugimotoa et al. | ......... 123/533 |
| 5,170,766 A | 12/1992 | Haas et al. | |
| 5,207,205 A | 5/1993 | Mesenich | |
| 5,261,375 A | 11/1993 | Rush, II et al. | |
| 5,279,327 A | 1/1994 | Alsobrooks et al. | |
| 5,291,822 A | 3/1994 | Alsobrooks et al. | |
| 5,315,968 A | 5/1994 | Niebrzydoski | |
| 5,320,078 A | 6/1994 | Lorraine | |
| 5,381,816 A | 1/1995 | Alsobrooks et al. | |
| 5,463,997 A | 11/1995 | Cutler | |
| 5,577,478 A | 11/1996 | Tuckey | |
| 5,577,480 A | 11/1996 | Gmelin et al. | |
| 5,666,927 A | 9/1997 | Pace et al. | |
| 5,794,600 A | 8/1998 | Hill | |
| 6,053,149 A | 4/2000 | Lorraine | |
| 6,161,527 A | * 12/2000 | Ruman | ........................ 123/533 |

FOREIGN PATENT DOCUMENTS

EP        0 141 883 A1    5/1985

* cited by examiner

Primary Examiner—Thomas N. Moulis
(74) Attorney, Agent, or Firm—Cooley Godward, LLP

(57) ABSTRACT

An assembly for an air assist fuel injection system have a rail configured to fluidly communicate pressurized gas to a fuel pressure regulator and to an air assist fuel injector of the system. The assembly further includes a cover configured to fluidly communicate fuel to the fuel pressure regulator and to a fuel injector of the air assist fuel injection system.

58 Claims, 11 Drawing Sheets

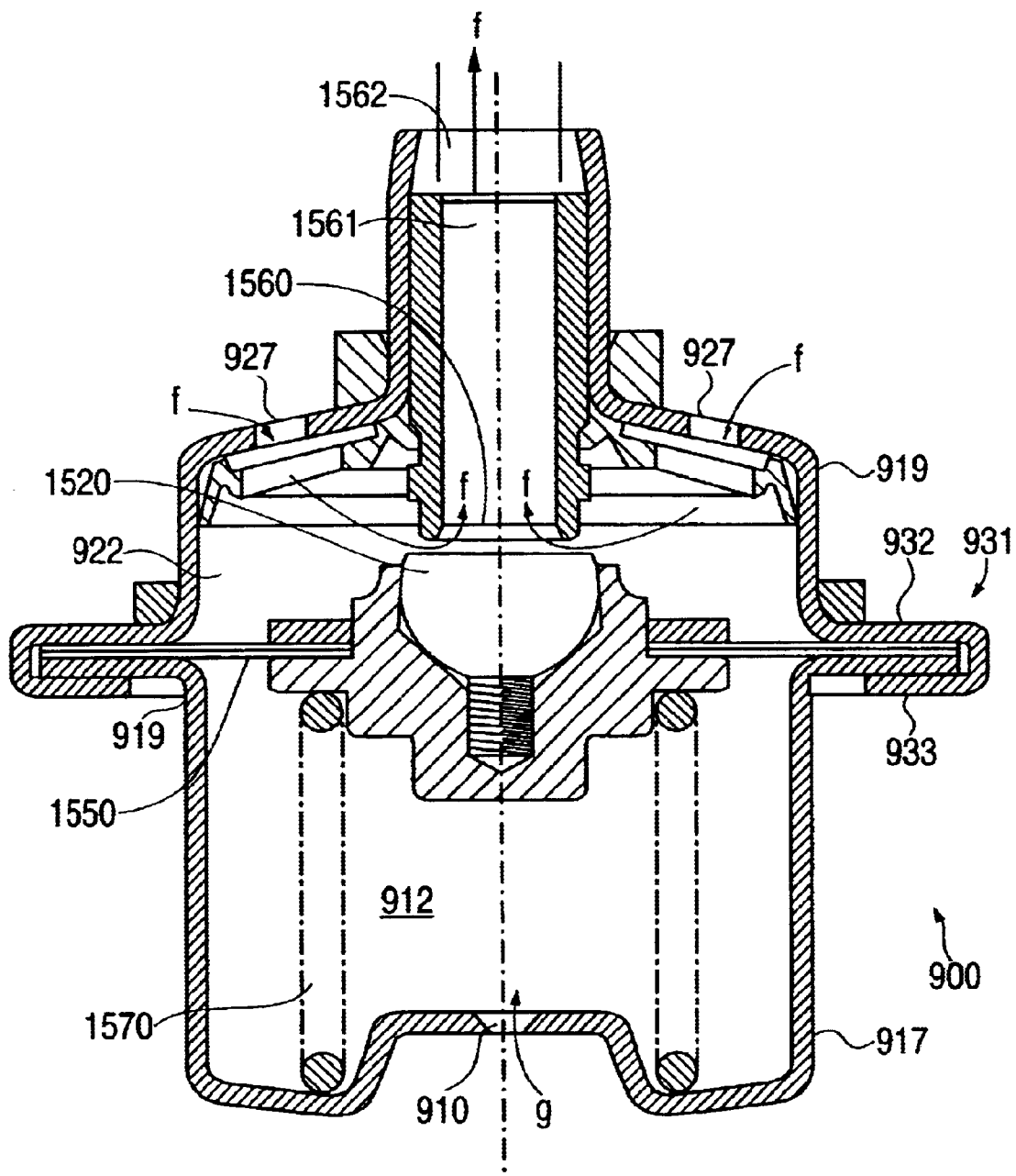

METHODS AND ASSEMBLIES FOR DELIVERING FUEL AND GAS IN AIR ASSIST FUEL INJECTION SYSTEMS

BACKGROUND OF THE INVENTION

1. Field of the Invention

The present invention relates to air assist fuel injection systems and, more particularly, to methods and assemblies for delivering fuel and gas to fuel pressure regulators, fuel injectors, and/or air assist fuel injectors of such air assist fuel injection systems.

2. Description of the Related Art

Conventional fuel injectors are configured to deliver a quantity of fuel to a combustion cylinder of an engine. To increase combustion efficiency and decrease pollutants, it is desirable to atomize the delivered fuel. Generally speaking, atomization of fuel can be achieved by supplying high-pressure fuel to conventional fuel injectors, or atomizing low pressure fuel with pressurized gas, i.e., "air assist fuel injection."

In one conventional configuration of an air assist fuel injection system, an air assist fuel injector is located in the head of an engine, which is adjacent a rail that houses a conventional fuel injector and also defines a mount for the air assist fuel injector. The conventional fuel injector and the rail are configured such that a metered quantity of fuel is delivered from the fuel injector directly to the air assist fuel injector. Additionally, the rail includes a number of passageways that deliver pressurized air to the air assist fuel injector. The air assist fuel injector atomizes the received fuel with the pressurized air and conveys the air and fuel mixture to the combustion chamber of the engine. This conventional air assist fuel injection system typically includes a fuel pressure regulator, such as a diaphragm or differential pressure regulator, which generally maintains the fuel supply pressure at an acceptable level so that proper fuel flow characteristics to and through the injectors are assured. In the conventional configuration, the fuel pressure regulator maintains this fuel pressure at the desired level by maintaining a pressure differential between the fuel supply pressure and a reference pressure, such as the air supply pressure to the air assist fuel injector. The fuel pressure regulator is typically mounted on the rail of the air assist fuel injection system such that an external conduit typically communicates the pressurized gas to the fuel pressure regulator and a conduit in the rail communicates fuel to the fuel pressure regulator. In addition, one or more conduits within the rail deliver pressurized gas to the air assist fuel injector and fuel to the fuel injector. Unfortunately, this conventional configuration is sometimes too large for certain engine applications and is difficult to assemble and incorporate in an engine.

SUMMARY

In light of the previously described problems associated with conventional air assist fuel injection systems, embodiments of the present invention strive to provide compact configurations for supplying fuel and gas to fuel pressure regulators, fuel injectors, and/or air assist fuel injectors of air assist fuel injection systems.

In accordance with one aspect of the present invention, an assembly for an air assist fuel injection system includes a fuel injector, an air assist fuel injector, a pressure regulator, a rail, and a cover. The rail has at least one conduit for supplying pressurized gas for a gas reference chamber of the pressure regulator and for the air assist fuel injector. The rail also includes a cavity that receives at least a portion of the pressure regulator, and a passageway that receives at least a portion of the fuel injector and that receives at least a portion of the air assist fuel injector. The cover receives at least a portion of the pressure regulator and the fuel injector, and includes a conduit for fluidly communicating fuel to a fuel chamber of the pressure regulator and to the fuel injector.

In accordance with another aspect of the present invention, an alternative assembly for an air assist fuel injection system includes a rail configured to fluidly communicate pressurized gas to a fuel pressure regulator and to an air assist fuel injector, and a cover configured to fluidly communicate fuel to the fuel pressure regulator and to fluidly communicate fuel to the fuel injector.

Another aspect of the present invention concerns an assembly having an air assist fuel injector, a fuel pressure regulator, a rail having at least one conduit therein configured to fluidly communicate pressurized gas to the fuel pressure regulator and to the air assist fuel injector, a fuel injector, and a cover having at least one conduit therein configured to fluidly communicate fuel to the fuel injector and to the fuel pressure regulator.

In accordance with a further aspect of the present invention, a method includes supplying pressurized gas to a fuel pressure regulator and to an air assist fuel injector via at least one internal conduit of a rail, and supplying fuel to the fuel pressure regulator via at least one internal conduit of a cover that receives the pressure regulator.

In accordance with yet another aspect of the present invention, a method includes supplying pressurized gas to a fuel pressure regulator and to an air assist fuel injector via at least one internal conduit of a rail, and supplying fuel to a fuel injector via at least one internal conduit of a cover that receives the fuel injector.

In accordance with a further aspect of the present invention, a method includes inserting an air assist fuel injector into an engine, attaching an assembly to the engine, the assembly including a fuel injector and a fuel pressure regulator, the rail being configured to communicate pressurized gas to the fuel pressure regulator and the air assist fuel injector, the assembly further including a cover configured to communicate fuel to the fuel injector and to the fuel pressure regulator.

In accordance with another aspect of the present invention an assembly includes a fuel pressure regulator, a rail having internal conduit means for communicating pressurized gas to the fuel pressure regulator and to an air assist fuel injector, and a cover having internal conduit means for communicating fuel to the fuel pressure regulator and to a fuel injector.

In accordance with a further aspect of the present invention a method includes retaining a pressure regulator in a cavity of a rail and a fuel injector in a passageway of the rail by covering the pressure regulator and the fuel injector with a cover configured to communicate fuel to the pressure regulator and the fuel injector, the pressure regulator for maintaining a pressure differential between a fuel supply and a gas supply for an air assist fuel injector.

In accordance with another aspect of the present invention an assembly includes a pressure regulator configured to maintain a pressure differential between a fuel supply and a gas supply, the pressure regulator having a fuel housing defining a fuel chamber and a gas reference chamber housing defining a gas reference chamber, a rail configured to receive at least a portion of the gas reference housing and having an internal conduit configured to supply pressurized gas to the pressure regulator, and a cover attached to the rail and covering the pressure regulator, the cover having a first internal conduit configured to supply fuel to a fuel inlet of the pressure regulator, the cover having a second internal conduit configured to receive fuel from a fuel outlet of the pressure regulator.

In accordance with yet another aspect of the present invention an air assist fuel injection system includes a fuel supply line, a gas supply line, a fuel pressure regulator, a fuel injector, an air assist fuel injector, a rail configured to fluidly communicate gas from the gas supply line to the fuel pressure regulator and to the air assist fuel injector, and a cover configured to fluidly communicate fuel from the fuel supply line to the fuel pressure regulator and to the fuel injector.

Other advantages and features associated with the embodiments of the present invention will become more readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

BRIEF DESCRIPTION OF THE DRAWINGS

FIG. 14 is a cross-sectional view of the pressure regulator of the assembly illustrated in FIG. 2 taken along the line 6—6 in FIG. 5.

DETAILED DESCRIPTION

Figure 1:
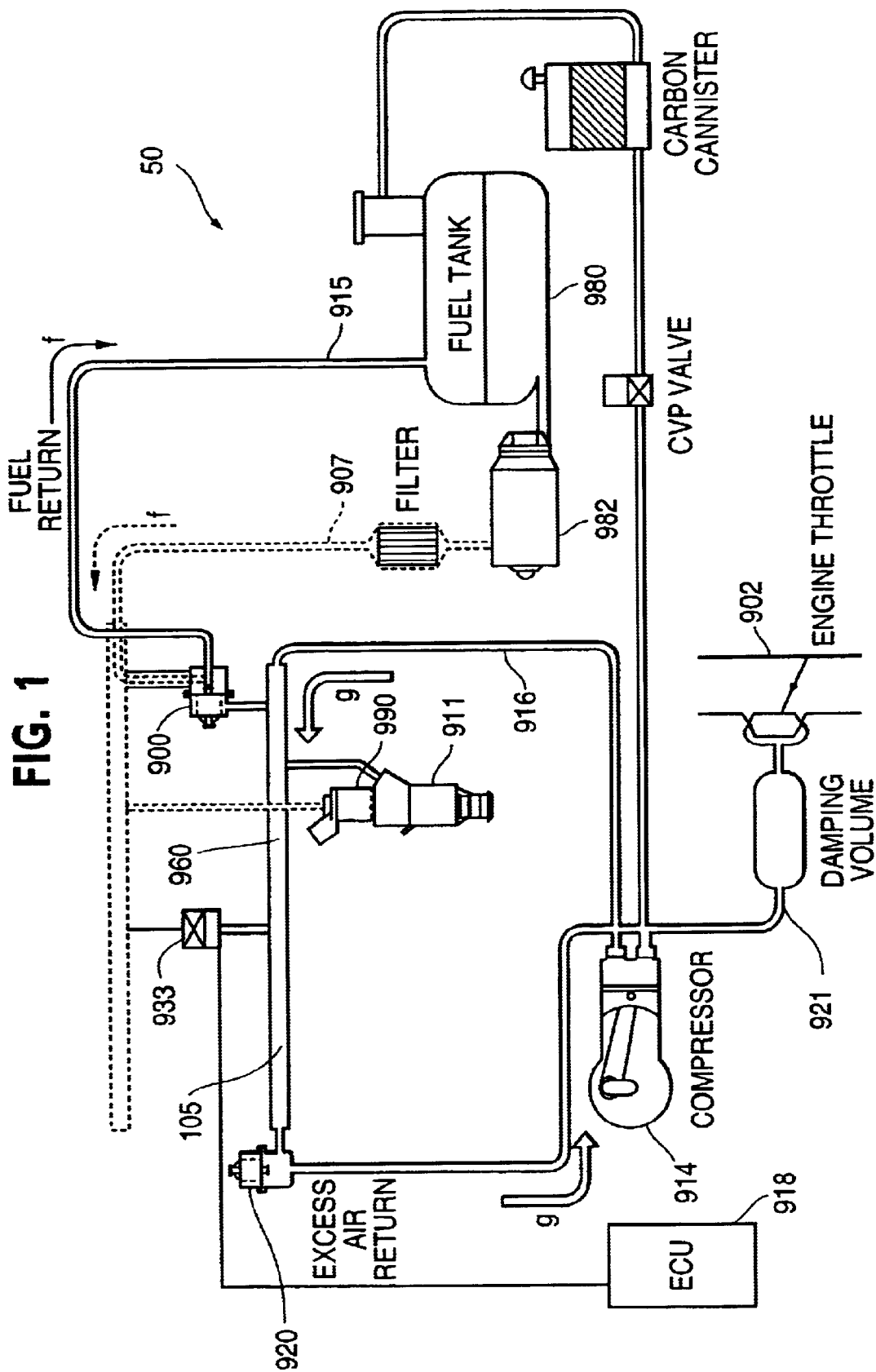
FIG. 1 is a schematic flow diagram of an air assist fuel injection system according to one embodiment of the present invention.
Figure 2:
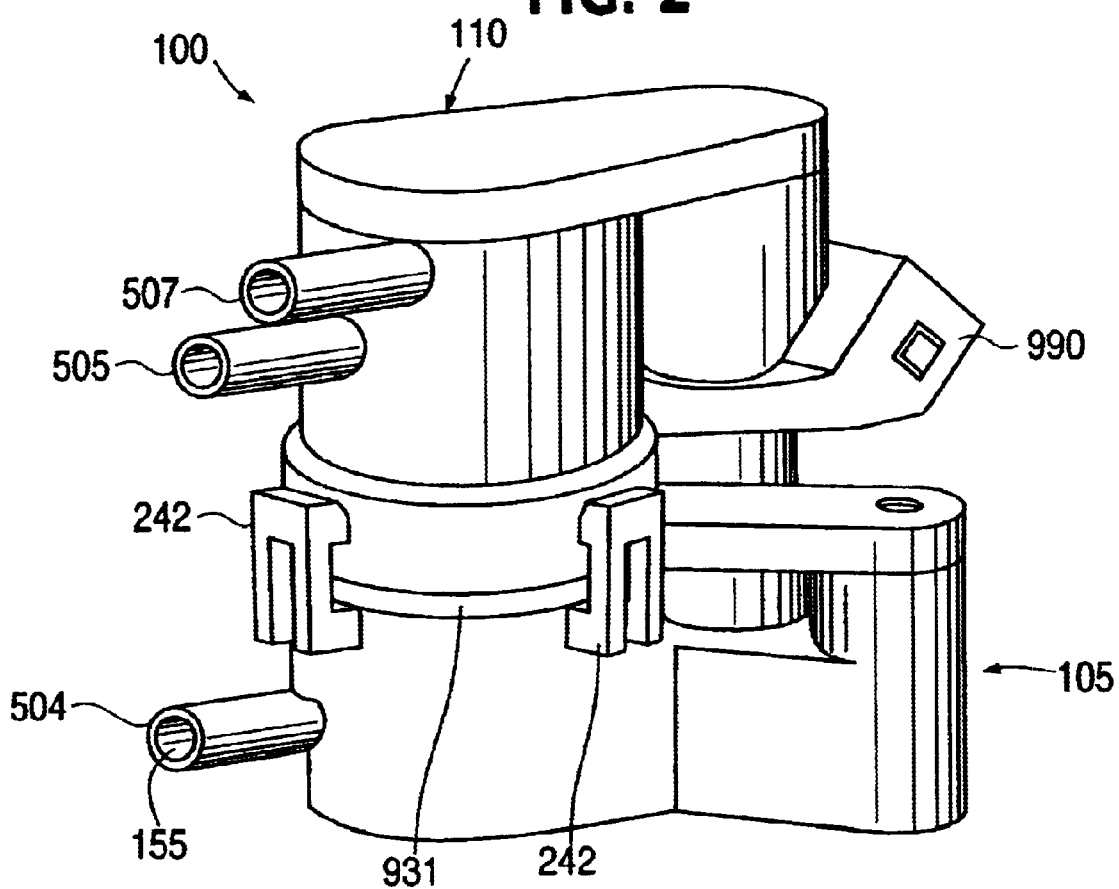
FIG. 2 is a front perspective view of an assembly of the air assist fuel injection system illustrated in FIG. 1 and in accordance with one embodiment of the present invention.
Figure 3:
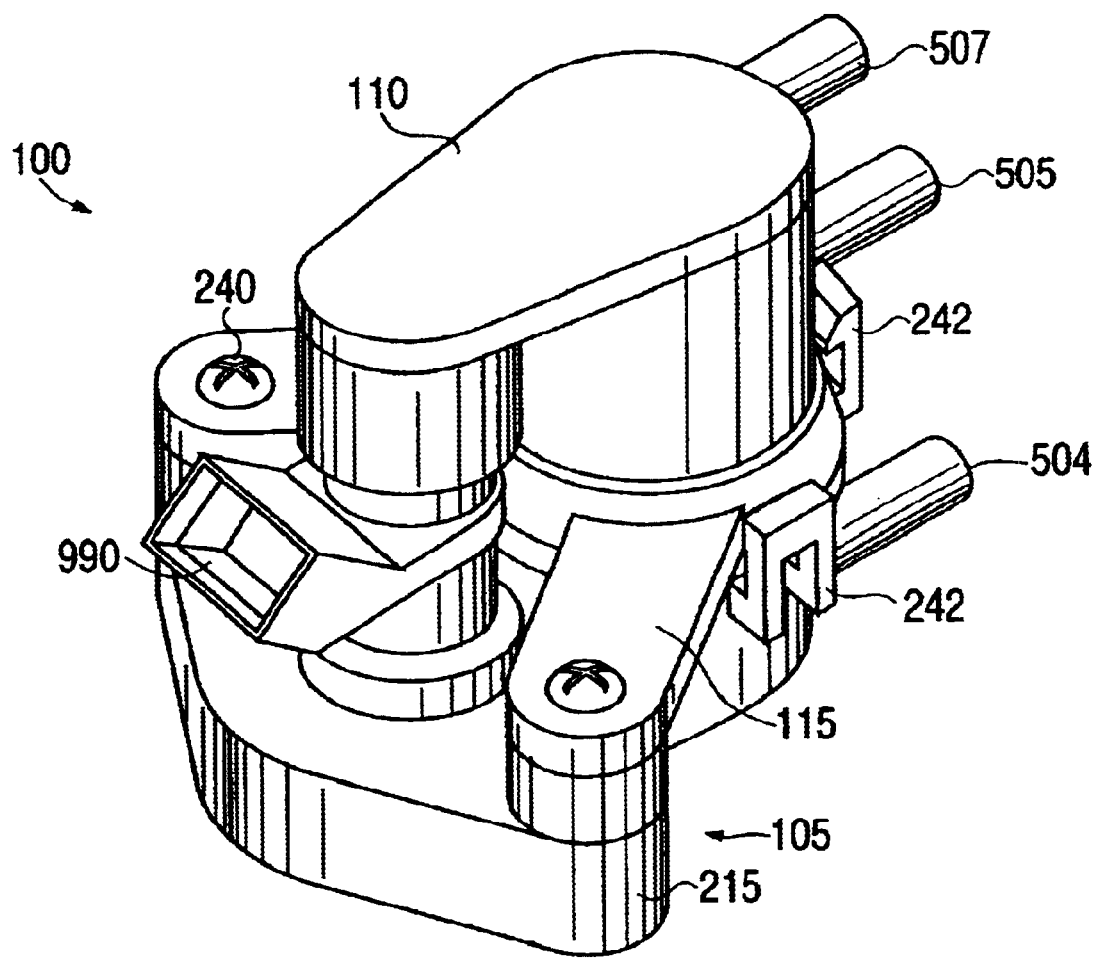
FIG. 3 is a rear perspective view of the assembly illustrated in FIG. 2.

FIG. 1 illustrates a flow diagram of an air assist fuel injection system 50 in accordance with one embodiment of the present invention. The illustrated embodiment of the air assist fuel injection system 50 is configured for a two-stroke engine and includes one fuel injector 990 and one air assist fuel injector 911. Alternative embodiments of the air assist fuel injection system 50 may include more injectors 990, 911 and, depending on the specific engine application, more or fewer system components than those illustrated in FIG. 1. For example, in an alternative embodiment, the system 50 includes four air assist fuel injectors 911 and four fuel injectors 990.

The operation of the air assist fuel injection system 50 is first briefly described, followed by description of an assembly 100 of the air assist fuel injection system. During operation of the air assist fuel injection system 50, pressurized gas from a compressor 914 is supplied to a rail 105 via a gas line 916. The rail 105 then fluidly communicates the pressurized gas to the air assist fuel injector 911 and to a fuel pressure regulator 900. In the illustrated embodiment, a gas pressure regulator 920 is included in the gas supply flow path g and maintains the gas supply pressure at an essentially constant level during operation of the system 50. A gas pressure sensor 933 and a damping volume 921 are also included in the illustrated gas supply flow path g.

Liquid fuel is also supplied to a cover 110 from a fuel tank 980 via a fuel line 907 by a pump 982. The cover 110 then fluidly communicates the fuel to the fuel injector 990 and the fuel pressure regulator 900. As is illustrated in FIG. 1, the fuel pressure regulator 900 is in the fuel supply flow path f between the fuel tank 980 and the fuel injector 990, as well as in the gas supply flow path g between the compressor 914 and the air assist fuel injector 911. The fuel pressure regulator 900 maintains the fuel supply pressure at a generally constant level during operation of the air assist fuel injection system 50 to ensure proper fuel flow characteristics to and through the injectors 990, 911. As described below in greater detail, the fuel pressure regulator 900 maintains this fuel supply pressure at a constant level by maintaining a pressure differential between the fuel supply pressure and a reference pressure. Because the gas supply pressure is generally constant in the illustrated embodiment, it serves as a reference pressure by which the fuel pressure regulator 900 sets the fuel supply pressure for the injectors 990, 911. During operation of the fuel pressure regulator 900, fuel is returned from the fuel pressure regulator to the cover 110, which in turn fluidly communicates the returned fuel to the fuel tank 980 via a fuel return line 915.

During operation of the air assist fuel injection system 50, the fuel injector 990 receives the fuel from the cover 110 and then delivers a metered quantity of fuel to the air assist fuel injector 911. The air assist fuel injector 911 atomizes the fuel supplied from the fuel injector 990 with the pressurized gas supplied from the rail 105, and conveys the atomized mixture to a combustion chamber 1002 of an engine 1000 (see FIG. 6a).

To increase or decrease the speed of the engine 1000, a throttle 902 is adjusted by an operator or computer. In response to this operation, an electronic control unit ("ECU") 918 sends a signal to the fuel injector 990 and/or the air assist fuel injector 911 which decreases or increases the mass flow rate of fuel from the air assist fuel injector 911 to correspondingly increase or decrease the speed of the engine. For example, to increase the volume of fuel delivered by the air assist fuel injector 911 in response to a throttle change, the ECU 918 may: (1) instruct a solenoid of the fuel injector 990 to stay open longer; (2) instruct a solenoid of the air assist fuel injector 911 to stay open longer; and/or (3) change the delay between the respective openings of the injectors 990, 911. Thus, the ECU 918 controls changes in the fuel flow from the injectors 990, 911 while the fuel pressure regulator 900 maintains the fuel supply pressure at a constant level.

The air assist fuel injection system 50 and the air assist fuel injector 911 are termed "air assist" because each preferably utilizes pressurized air to atomize liquid fuel. The pressure of the liquid fuel is preferably higher than that of the air. Although it is preferred that the air assist fuel injector 911 atomize liquid gasoline with pressurized air delivered by the rail 105, it will be realized that the air assist fuel injector 911 may atomize many other liquid combustible forms of energy with any variety of gases. For example, the air assist fuel injector 911 may atomize liquid kerosene or liquid methane with pressurized gaseous oxygen, propane, or exhaust gas. Hence, the terms "air assist fuel injector" and "air assist fuel injection system" are terms of art, and as used herein are not intended to dictate that the air assist fuel injection system 50 or the air assist fuel injector 911 be used only with pressurized air.

FIGS. 2–14 illustrate features of one embodiment of an assembly 100 of the air assist fuel injection system 50 in accordance with the present invention. The assembly 100 is essentially one or more bodies configured to fluidly communicate pressurized gas and/or fuel to the fuel injector 990, the air assist fuel injector 911, and/or the fuel pressure regulator 900. In one embodiment, the assembly 100 includes the rail 105, the cover 110, the fuel injector 990, and the fuel pressure regulator 900, which when assembled are readily mountable as a unit to the engine 1000 having the air assist fuel injector 911 mounted therein. Alternative embodiments of the assembly 100 may include more or fewer of the components of the air assist fuel injection system 50. For example, an alternative embodiment of an assembly 50 in accordance with the present invention also includes the gas pressure regulator 920 and the gas pressure sensor 933. In a further embodiment of the present invention, the assembly 100 only includes the rail 105, the fuel pressure regulator 900, and the air assist fuel injector 911. In a further embodiment of the present invention, the assembly 100 only includes the cover 110 and the rail 105.

Figure 4:
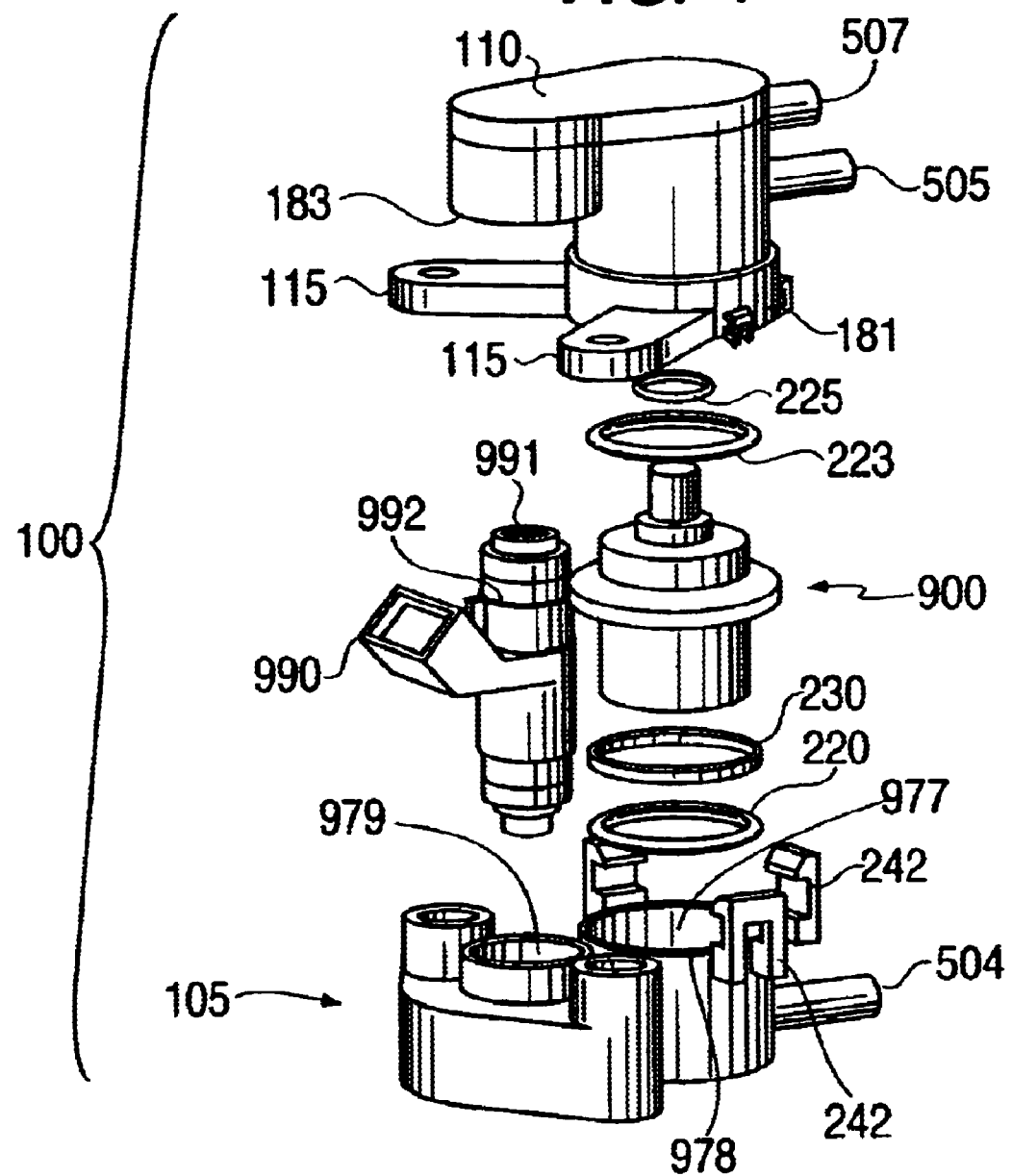
FIG. 4 is an exploded view of the assembly illustrated in FIG. 2.
Figure 5:
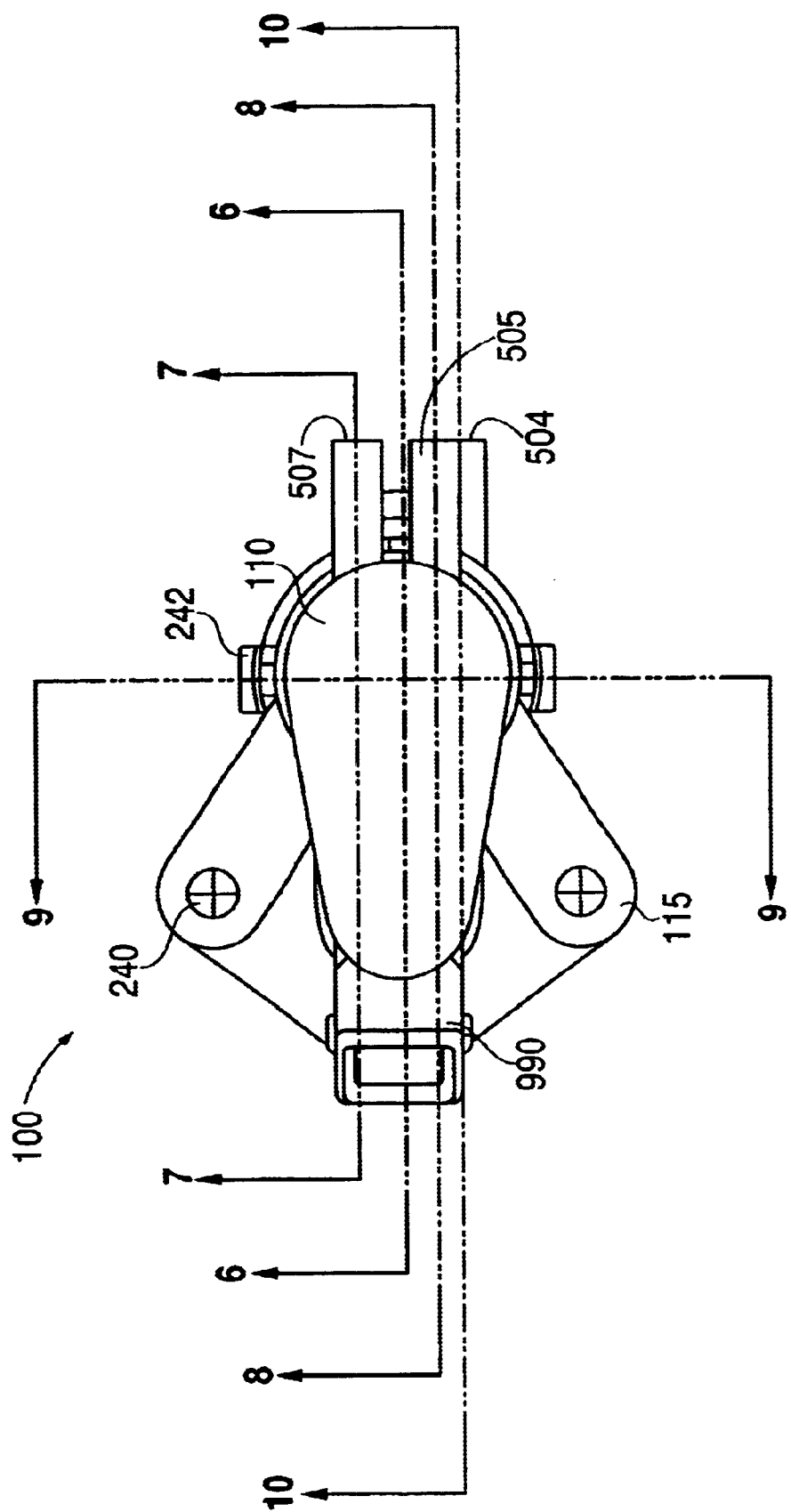
FIG. 5 is a top view of the assembly illustrated in FIG. 2.
Figure 6:
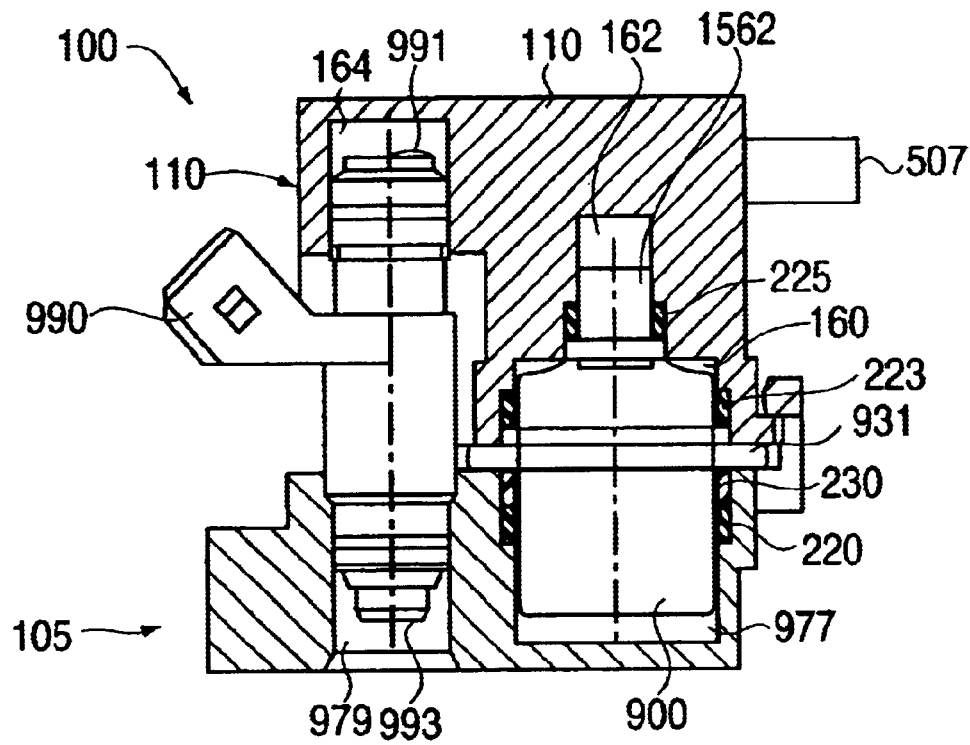
FIG. 6 is a cross-sectional view of the assembly illustrated in FIG. 2 taken along the line 6—6 in FIG. 5.

As illustrated in FIGS. 4 and 6, the assembly 100 includes the fuel pressure regulator 900, one embodiment of which is illustrated in FIG. 14. The fuel pressure regulator 900 is configured to maintain the fuel supply pressure at a generally constant level to ensure proper fuel flow characteristics to and through the injectors 990, 911. The illustrated pressure regulator 900 includes a gas reference chamber 912 defined by a gas reference housing 917, and a fuel chamber 922 defined by a fuel housing 919. The gas reference chamber 912 includes a gas reference inlet 910 that receives the pressurized gas communicated by the rail 105. The fuel chamber 922 includes fuel inlets 927 that receive fuel communicated by the cover 110. The fuel enters the fuel chamber 922 via the inlets 927 and, under certain conditions described below, exits the pressure regulator 900 through a fuel outlet 1562 of a conduit 1561. As is illustrated in FIGS. 14, a flexible, impermeable diaphragm 1550 is located between the gas reference chamber 912 and the fuel chamber 922. A stopper 1520 is attached to the diaphragm 1550 directly adjacent the inlet 1560 of the conduit 1561, and a spring 1570 is located between the gas reference housing 917 and the diaphragm 1550.

When the force on the fuel side of the diaphragm 1550 (due to the fuel pressure in the fuel chamber 922) is less than the force on the gas side of the diaphragm (due to the gas pressure and the force of the spring), the stopper 1520 will be biased toward the inlet 1560 of the conduit 1561 such that it seals the inlet of the conduit 1561 and fuel does not flow out of the pressure regulator outlet 1562. When the stopper 1520 is in this position, the pressure regulator 900 is "closed".

When the pressure regulator 900 is closed, the pump 982 will gradually increase the fuel pressure until the force on the fuel side of the diaphragm 1550 (due to the pressure of the fuel in the fuel chamber 922) is greater than the force on the gas side of the diaphragm (due to the gas pressure in the gas reference chamber 912 and the force of the spring 1570). When this occurs, the diaphragm 1550 and the attached stopper 1520 will move away from the inlet 1560 of the conduit 1561 such that the fuel flows through the conduit 1561 and out the outlet 1562 of the fuel pressure regulator 900 as indicated in FIG. 15 by the fuel flow path f. As is illustrated in FIG. 14, when the stopper 1520 is not abutting the inlet 1560, the fuel pressure regulator 900 is "open" and fuel flows through the fuel pressure regulator.

When the pressure regulator 900 is open, the fuel returns to the fuel tank 980 the fuel return line 915. This decreases the head or pressure of the fuel supply to the injectors 990, 911. The pressure of the fuel supply will continue to decrease until the force on the fuel side of the diaphragm 1550 is less than the force on the gas side of the diaphragm 1550 such that the fuel pressure regulator 990 is closed. This opening and closing of the fuel pressure regulator 900 will repeatedly occur as the fuel supply pressure slightly rises and falls during operation of the system 50. As will be appreciated, the fuel pressure regulator 900 maintains a pressure differential between the gas supply pressure and the fuel supply pressure, where the pressure differential is proportional to the biasing force of the spring 1570. Because the gas supply pressure is generally constant during operation of the system 50, the pressure regulator 900 thus maintains the fuel supply pressure at a substantially constant level, which ensures proper fuel flow characteristics through the injectors 990, 911 at different fueling levels.

In alternative embodiments of the assembly 100, the fuel pressure regulator 900 takes other configurations. For example, the fuel pressure regulator 900 may control the fuel supply pressure based on the gas supply pressure with an electronic valve and pressure sensor. Exemplary fuel pressure regulator 900 are also described in U.S. Pat. Nos. 5,381,816 and 4,934,329, the entire disclosures of which are hereby incorporated by reference.

As described above, the fuel pressure regulator 900 controls the fuel supply pressure by utilizing fuel and pressurized gas. One feature of the preferred assembly 100 is that it is configured to deliver pressurized gas and fuel to the fuel pressure regulator 900 such that the fuel pressure regulator can maintain the pressure differential between the pressurized fuel supply and the pressurized gas supply. In the preferred embodiment of the assembly 100, the cover 110 of the assembly 100 fluidly communicates the liquid fuel to the fuel pressure regulator 900, and the rail 105 of the assembly 100 fluidly communicates the pressurized gas to the fuel pressure regulator.

Figure 6A:
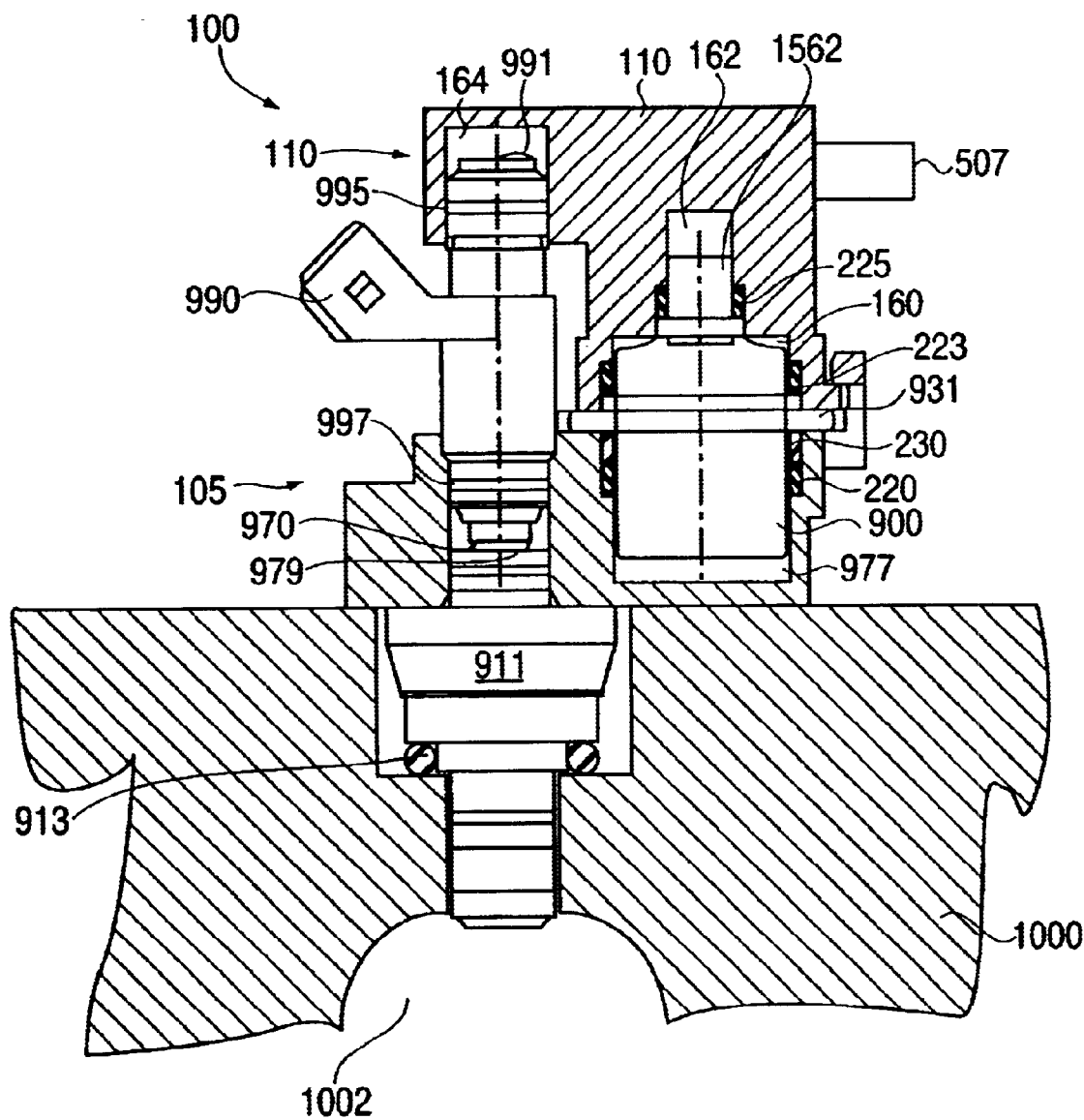
FIG. 6A is a cross-sectional view of the assembly illustrated in FIG. 2 taken along the line 6—6 in FIG. 5, where the assembly is mounted to the head of an engine having an air assist fuel injector therein.
Figure 10:
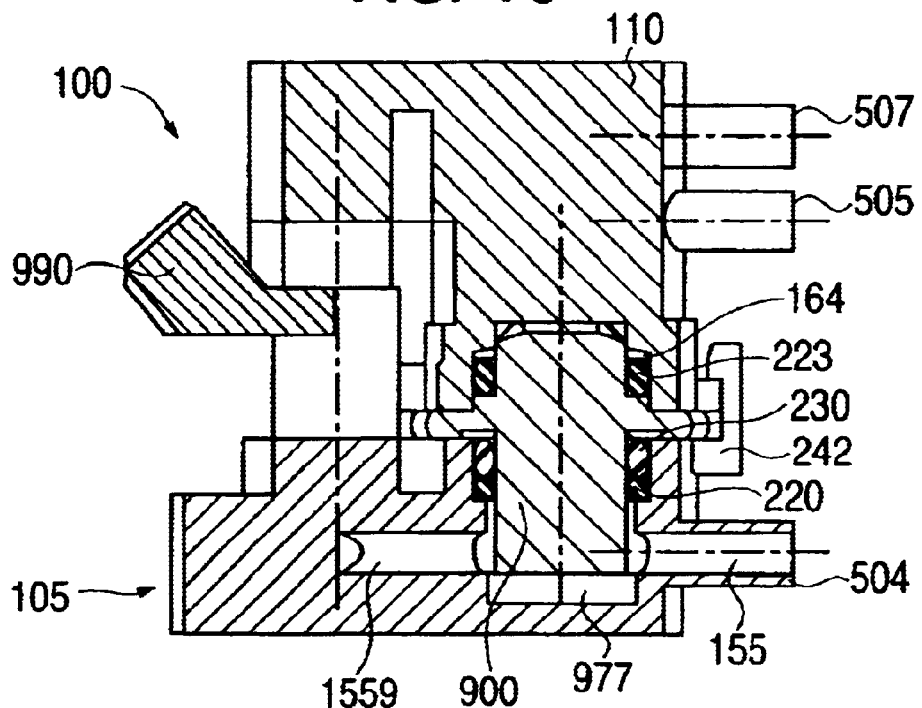
FIG. 10 is a cross-sectional view of the assembly illustrated in FIG. 2 taken along the line 10—10 in FIG. 5.
Figure 11:
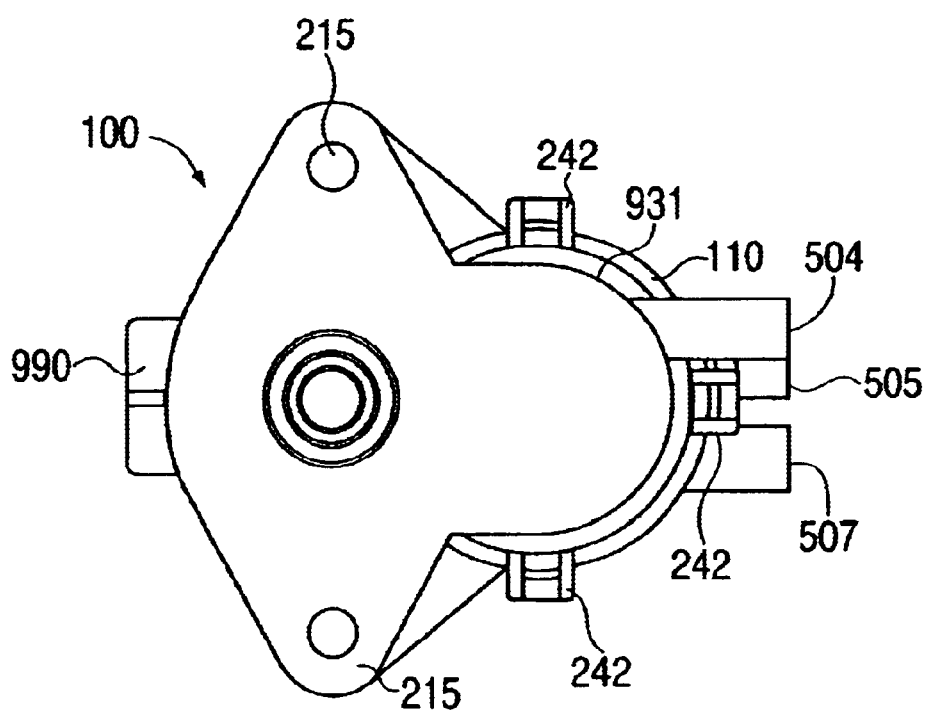
FIG. 11 is a bottom view of the assembly illustrated in FIG. 2.
Figure 12:
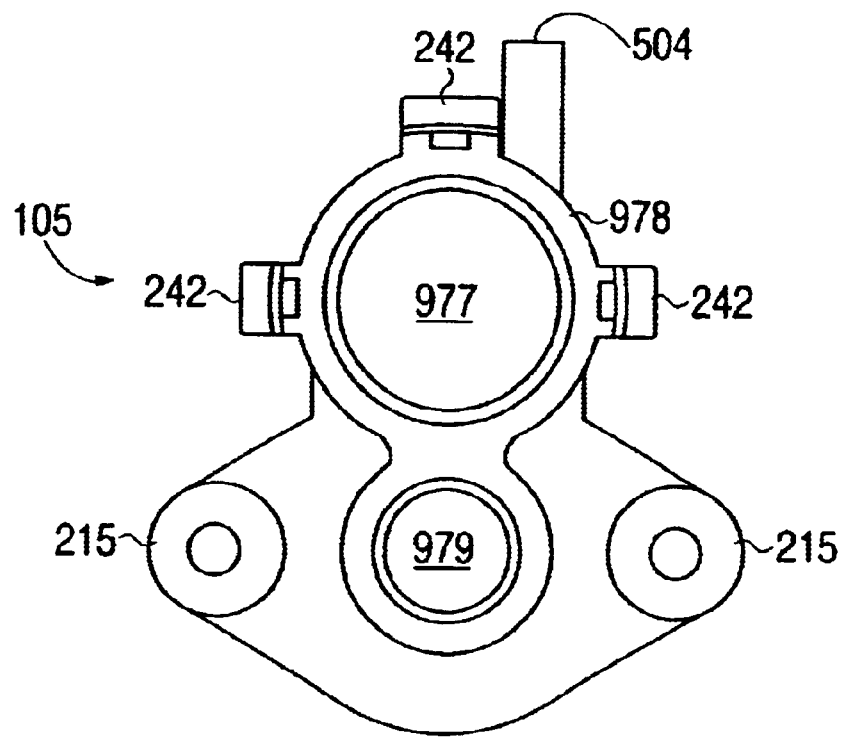
FIG. 12 is a top view of the rail of the assembly illustrated in FIG. 2.
Figure 13:
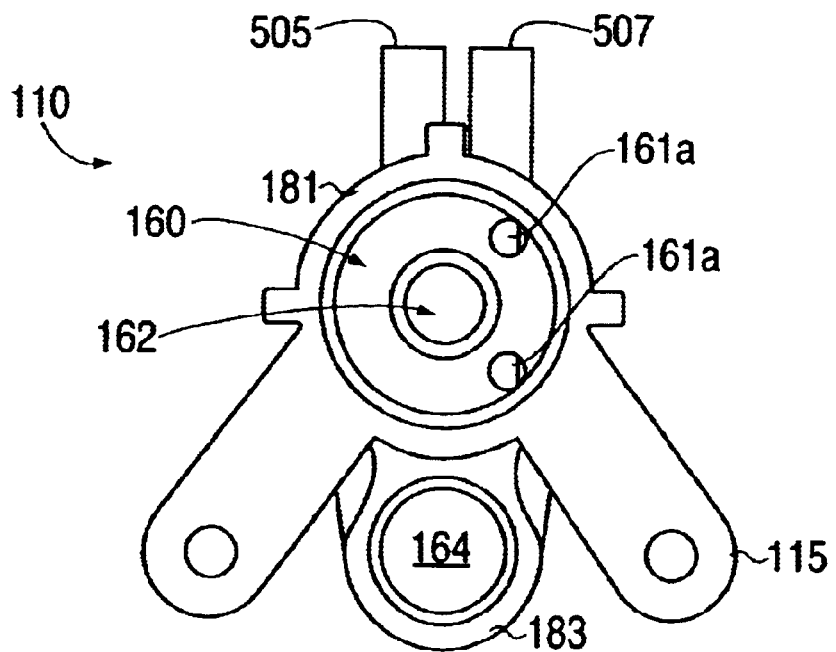
FIG. 13 is a bottom view of the cover of the assembly illustrated in FIG. 2.

The rail 105 is a body that is configured to mount directly against, adjacent to, or generally near the head 1002 of the engine 1000 (See FIG. 6a). As is illustrated in FIGS. 2–12, the rail 105 includes a cavity 977 that receives at least a portion of the fuel pressure regulator 900. The cavity 977 is a recess, indentation, bore, or other area capable of receiving a portion of the fuel pressure regulator 900, preferably at least a portion of the gas reference housing 917 having the gas reference inlet 910. As is illustrated in FIG. 10, the rail 105 includes an internal conduit 155, which is a channel, duct, tunnel, or other passageway inside the periphery of the rail that fluidly communicates pressurized gas from a gas inlet 504 of the rail to the cavity 977. In the preferred embodiment, the conduit 155 is a cylindrical and elongated bore within the body of the rail 105. Hence, the pressurized gas enters the gas inlet 504 of the rail 105 from the gas line 916, and the internal conduit 155 communicates the pressurized gas to the cavity 977 that receives the fuel pressure regulator 900. Because the gas reference inlet 910 of the fuel pressure regulator 900 is located within the cavity 977, pressurized gas communicated to the cavity by the conduit 155 will enter the gas reference chamber 912 of the fuel pressure regulator for use by the fuel pressure regulator 900 as described above. In an alternative embodiment, the rail 105 includes a plurality of separate conduits 155 that fluidly communicate pressurized gas to the fuel pressure regulator 900.

Figure 7:
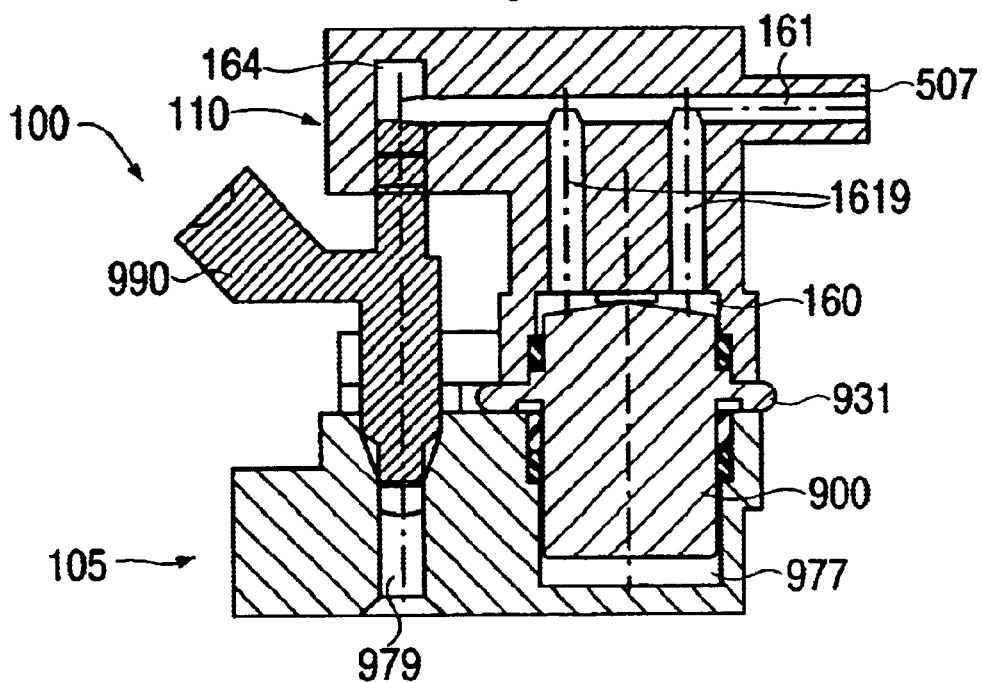
FIG. 7 is a cross-sectional view of the assembly illustrated in FIG. 2 taken along the line 7—7 in FIG. 5.

The fuel is supplied to the fuel pressure regulator 900 by the cover 110, which is essentially a lid, top, cap, overlay, or other body configured to cover at least a portion of the fuel pressure regulator 900 and to fluidly communicate pressurized fuel to the fuel pressure regulator 900. Hence, as is illustrated in FIGS. 6–10 and 13, the cover 110 also includes a cavity 160 that receives at least a portion of the fuel pressure regulator 900, preferably the portion of the fuel housing 919 having the fuel inlets 927. As is illustrated in FIG. 7, the cover 110 includes internal conduits 161, 161a inside the periphery of the cover that fluidly communicate fuel from a fuel inlet 507 of the cover to the cavity 160. Hence, the fuel enters the fuel inlet 507 of the cover 110 from the fuel line 907, and the internal conduits 161, 161a communicate the fuel to the cavity 160 that receives the fuel pressure regulator 900. Because the fuel inlets 927 of the fuel pressure regulator 900 are located within the cavity 160, fuel communicated to the cavity by the conduits 161 will enter the fuel chamber 922 of the fuel pressure regulator for use by the fuel pressure regulator as described above. In the illustrated embodiment, the cover 110 includes three internal conduits 161, 161a that each communicate fuel to the fuel pressure regulator 900. However, in alternative embodiments, the cover 110 includes more or fewer of the conduits 161. For example, in one embodiment, the cover 110 includes only one conduit 161 that fluidly communicates fuel to the fuel pressure regulator. In another embodiment, the cover 110 includes four conduits 161 that each fluidly communicate fuel to the fuel pressure regulator 900.

Figure 8:
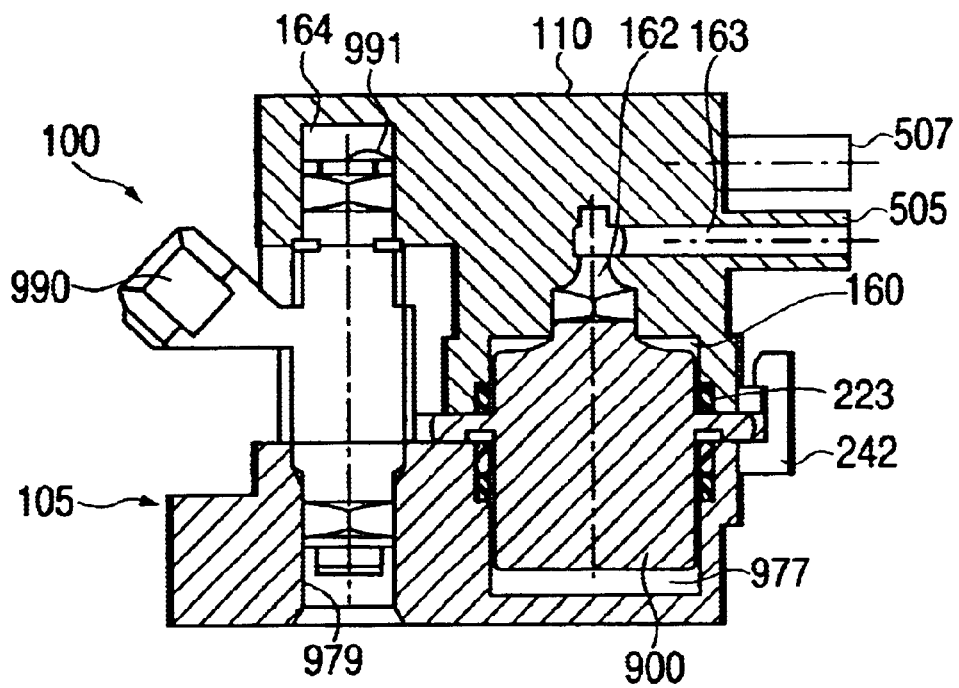
FIG. 8 is a cross-sectional view of the assembly illustrated in FIG. 2 taken along the line 8—8 in FIG. 5.
Figure 9:
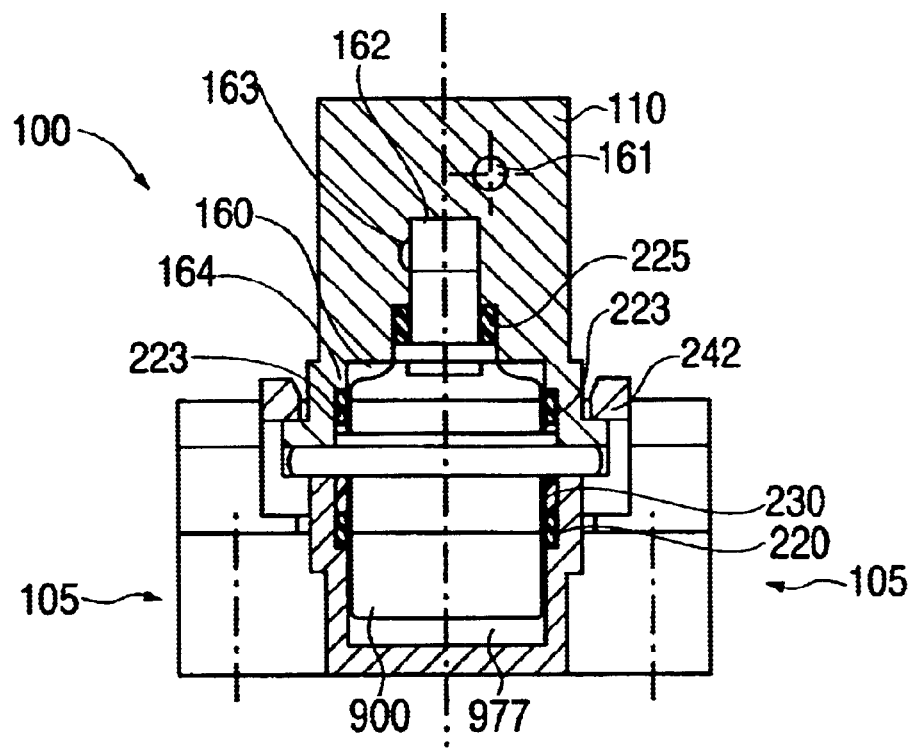
FIG. 9 is a cross-sectional view of the assembly illustrated in FIG. 2 taken along the line 9—9 in FIG. 5.

As described above, fuel will exit the fuel pressure regulator 900 through a fuel outlet 1562. In the preferred embodiment, the cover 110 is further configured to fluidly communicate pressurized fuel from the fuel outlet 1562 of the fuel pressure regulator 900. Hence, as is illustrated in FIGS. 6, 8–10, and 13, the cover 110 also includes a cavity 162 that receives at least a portion of the fuel pressure regulator 900, preferably the portion of the fuel housing 919 having the outlet 1562. As is illustrated in FIG. 8, the cover 110 includes another internal conduit 163 inside the periphery of the cover and that fluidly communicates fuel from the cavity 162 to a fuel outlet 505 of the cover 110. Hence, the fuel exiting the outlet 1562 of the fuel pressure regulator 900 enters the cavity 162, where it is then communicated by the conduit 163 to the fuel outlet 505 of the cover 110, which in turn communicates the fuel to the fuel return line 915 for eventual delivery to the fuel tank 980. As is apparent from FIGS. 7 and 14, the cavities 160,162 are preferably cylindrical bores extending into the body of the cover 110, where the diameter of the cavity 162 is less than that of the cavity 160.

As is also apparent from FIGS. 6–9 and 13, the cover 110 also fluidly communicates fuel to the fuel injector 990 and preferably covers at least a portion of the fuel injector. Hence, the cover 110 includes a further cavity 164 that receives at least a portion of the fuel injector 990, preferably the portion of the fuel injector 990 having an inlet 991 that receives the fuel. As is illustrated in FIG. 7, the internal conduit 161 of the cover 110 extends from the inlet 507 of the cover 110 to the cavity 164 such that the internal conduit 161 fluidly communicates fuel from the inlet to the cavity 164. Hence, fuel enters the fuel inlet 507 of the cover 110 from the fuel line 907, and the internal conduit 161 communicates the fuel to the cavity 164 that receives the inlet 991 of the fuel injector 990. Because the inlet 991 of the fuel injector 990 is located within the cavity 164, fuel communicated to the cavity 164 by the conduit 161 will enter the fuel injector 990, which will inject a metered quantity of the fuel in the conventional manner. In the illustrated embodiment, the fuel injector 990 is a top-feed type fuel injector, such as the Deka IV Standard injector, commercially available from SIEMENS.

As is apparent from FIG. 4, one characteristic of the illustrated top-feed type fuel injector 990 is that the inlet 991 and an outlet 993 of the fuel injector 990 are coaxial with respect to the longitudinal axis of the fuel injector. In alternative embodiments, the cover 110 is configured to fluidly communicate fuel to differently configured fuel injectors, such as side-feed type fuel injectors and bottom-feed type fuel injectors. Although the conduit 161 fluidly communicates fuel to both the fuel pressure regulator 900 and the fuel injector 990, it will be appreciated that the cover 110 may be configured to fluidly communicate fuel to the fuel pressure regulator 900 and the fuel injector 990 in alternative manners. For example, in accordance with one embodiment of the present invention, the cover 110 includes a first conduit that communicates fuel solely to the fuel injector 990 and a second conduit that communicates fuel solely to the fuel pressure regulator 900, where both the first and the second conduits receive fuel from one or more fuel inlets 507.

As described above, the fuel injector 990 will deliver metered quantities of fuel to the air assist fuel injector 911, which will atomize the fuel with the pressurized gas. As is illustrated by FIGS. 4 and 6–10, the rail assembly 100 is configured to communicate the pressurized gas to the air assist fuel injector 911. Hence, the rail 105 includes a passageway 979 that receives at least a portion of the air assist fuel injector 911 and at least a portion of the fuel injector 990. The passageway 979 is a channel, corridor, opening, duct, or other area configured to receive a portion of the fuel injector 990 and the air assist fuel injector 991. In the preferred embodiment, the passageway 979 is a cylindrical bore passing completely through the body of the rail 105 and that receives at least an inlet 972 of the air assist fuel injector 911 and at least the outlet 993 of the fuel injector 990.

As is illustrated in FIG. 10, besides fluidly communicating pressurized gas to the fuel pressure regulator 900, the internal conduit 155 of the rail 105 also fluidly communicates pressurized gas from the gas inlet 504 of the rail 105 to the passageway 979. Hence, pressurized gas enters the gas inlet 504 of the rail 105 from the gas line 916, and the internal conduit 155 fluidly communicates the pressurized gas to the passageway 979 that receives the inlet 972 of the air assist fuel injector 911 and the outlet 993 of the fuel injector 990.

As is illustrated in FIG. 6A, an annular area 970 is located between the outlet 993 of the fuel injector 990 and the inlet 972 of the air assist fuel injector 990. In the preferred embodiment, the conduit 155 is located such that it opens into the passageway 979 at a location adjacent the area 970 such that pressurized gas communicated to the passageway 979 by the conduit 155 will enter the area 970. Because the inlet 972 of the air assist fuel injector 911 is located in the area 970 of the passageway 979 pressurized gas communicated to the passageway will enter the air assist fuel injector. Because the outlet 993 of the fuel injector 990 is directly adjacent the inlet 972 of the air assist fuel injector 911, fuel is injected from the fuel injector into the air assist fuel injector.

The air assist fuel injector 911 atomizes the fuel supplied from the fuel injector, 990 with the pressurized gas communicated by the rail 105, and conveys the atomized mixture to the combustion chamber 1002 of the engine 1000. Exemplary configurations of the air assist fuel injector 911 are described in U.S. Pat. Nos. 6,302,337 and 4,934,329, the entire disclosures of which are hereby incorporated by reference. In an alternative embodiment of the assembly 100, the rail 105 includes more than one internal conduit 155 that fluidly communicates pressurized gas to the fuel pressure regulator 900 and/or to the air assist fuel injector 911.

In the illustrated embodiment, a number of seals are defined between the fuel pressure regulator 900 and the cover 110. As is illustrated in FIG. 6, the assembly 100 includes a first seal member 223, which defines a seal between the cover 110 and the fuel pressure regulator 900 that prevents liquid fuel from leaking from the cavity 160 to the exterior environment. The seal member 223 abuts the fuel housing 917 and an interior surface of the cavity 160 to define the seal. The assembly 100 also includes a second seal member 225, which defines a seal between the fuel pressure regulator 900 and the cover 110 that prevents liquid fuel in the cavity 160 from leaking into the cavity 162 and vice versa. The seal member 225 abuts the fuel housing 917 adjacent the fuel outlet 1652 as well as the interior surface of the cavity 162.

As is also illustrated in FIG. 6, the assembly 100 includes a third seal member 220 and a retainer 230. The seal member 220 abuts the retainer 230, the interior surface of the cavity 977 and the gas housing 917 to define a seal that prevents pressurized gas in the cavity 997 from leaking to the exterior environment.

Additionally, a number of seals are defined between the fuel injector 990 and the cover 110, between the fuel injector and the rail 105, and between the air assist fuel injector 911 and the rail 105. Hence, as best seen in FIG. 6A, the assembly includes a fourth seal member 995 and a fifth seal member 997. The seal member 995 defines a seal between the fuel injector 990 and the interior surface of the cavity 164 to prevent liquid fuel from leaking from the cavity to the exterior environment. The seal member 997 defines a seal between the fuel injector 990 and the interior surface of the passageway 979 to prevent liquid fuel and pressurized gas from leaking to the exterior environment. As is illustrated in FIG. 6A, the air assist fuel injector 911 also includes a seal member 913 that defines a seal between the air assist fuel injector and the interior surface of the passageway 979 so as to prevent liquid fuel and gas from leaking to the exterior environment. The seals 220, 223, 225, 995, 997, 913 are preferably elastomeric o-rings.

To assemble the assembly 100, the fuel injector 990 is located in the fuel injector cavity 979 of the rail 105. The retainer 230 and seal member 220 are placed over the gas reference housing 917 of the fuel pressure regulator 900. The fuel pressure regulator 900 is then placed in the cavity 977 of the rail 105. The seal members 223, 225 are then placed over the fuel pressure regulator 900. The cover 110 is then attached to the rail 105 such that the fuel pressure regulator 900 and the fuel injector 990 are covered by the cover 110 and retained in the rail 105. In the preferred embodiment the cover 110 is attached to the rail 105 with clips 242, which are devices that grip or hold the cover to the rail. In alternative embodiments of the assembly 100, the cover 110 is attached to the rail 105 with other attachment devices, such as a threaded fastener clamp, weld, glue, or other device.

After the assembly 100 is assembled, the rail 105 is located adjacent the head of the engine 1000 (having the air assist fuel injector 911 mounted therein) such that the passageway 979 receives the inlet 972 of the air assist fuel injector 911. In the preferred embodiment, fasteners 240 are then passed through mounting flanges 115, 215 of the cover 110 and the rail 105 to attach the assembly 100 to the head of the engine 1000. The fasteners 240 thread into the engine 1000 and further bias the cover 110 toward the rail. In alternative embodiments, the assembly 100 is attached to the engine 1000 in other manners. For example, in one embodiment, the rail 105 is attached to the head with fasteners or other devices and the cover 110 is separately attached to the rail. It will be appreciated that the order of the above-noted assembly steps may vary. For example, the fuel injector 990 may be located in the rail 105 after the pressure regulator 900, and the rail 105 may be located on the head before the cover 110 is attached to the rail with clips 202.

Besides communicating pressurized fuel to the fuel pressure regulator 900 and the fuel injector 990, the preferred embodiment of the cover 110 also retains the pressure regulator 900 and the fuel injector 990 within the rail 105. That is, the cover 110 biases the pressure regulator 900 against the rail 105 so as to maintain the pressure regulator 900 in place within cavity 977 of the rail 105 and biases the fuel injector 990 against the rail so as to maintain the fuel injector in place within the passageway 979 of the rail 105. When assembled, a bottom face 181 of the cover 110 abuts an upper surface 932 of a pressure regulator flange 931, and a bottom surface 933 of the pressure regulator flange 931 abuts an upper surface 978 of the rail 105. Additionally, a bottom face 183 of the portion of the cover 110 adjacent the cavity 164 abuts a seat 992 of the fuel injector 990. Hence, the force attaching the cover 110 to the rail 105 retains the pressure regulator 900 in the rail 105. Because the pressure regulator 900 and the fuel injector 990 are not independently fixed to the rail 105, each is easily installed and removed, simplifying the assembly and disassembly of the assembly 100.

In alternative embodiments, the pressure regulator 900 is retained in the rail 105 in other manners. For example, the cover 110 may bias opposing surfaces of the cover 110, pressure regulator 900, fuel injector 990, and rail 105 in the radial direction of the pressure regulator. In a further embodiment of the assembly 100 of the present invention, the cover 110 does not retain the pressure regulator 900 or the fuel injector 990 within the rail 105. For example, the cover 110, the pressure regulator, and the fuel injector 990 may be independently fixed to the rail 105 with separate fasteners.

While the preferred embodiment of the cover 110 is illustrated, it will be appreciated that the cover 110 may take alternative configurations that are also effective to fluidly communicate pressurized fuel to the inlet 927 of the pressure regulator 900 and the fuel inlet 491 of the fuel injector 990.

Additionally, the rail 105 may take other configurations. For example, in an alternative embodiment, the rail 105 does not receive the fuel injector 990 or the air assist fuel injector 911. In this alternative embodiment, the fuel injector 990 and/or the air assist fuel injector 911 are mounted to the head of the engine 1000 or another body separate from the rail 105. The rail 105 may also include differently configured conduits for conveying the pressurized gas.

As will be appreciated, the assembly 100 according to one embodiment of the present invention fluidly communicates pressurized fuel to the fuel pressure regulator 900 and the fuel injector 990, and pressurized gas to the air assist fuel injector 911 and the fuel pressure regulator 900 in a compact and easily assembled manner. Additionally, as a unit, the assembly 100 is easily mounted and attached to the engine 1000. Hence, the assembly 100 decreases manufacturing and assembly complications and simplifies replacement or repair of the assembly components as compared to some concentrical configurations.

The principles, preferred embodiments, and modes of operation of the present invention have been described in the foregoing description. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention is defined in the claims be embraced thereby.

What is claimed is:

1. An assembly for an air assist fuel injection system, comprising:
    a fuel injector;
    an air assist fuel injector;
    a pressure regulator having a gas reference chamber and a fuel chamber separated by a diaphragm;
    a rail having at least one conduit for supplying pressurized gas for said gas reference chamber and for said air assist fuel injector, a cavity that receives at least a portion of said pressure regulator, and a passageway that receives at least a portion of said fuel injector and that receives at least a portion of said air assist fuel injector; and
    a cover that receives at least a portion of said pressure regulator and said fuel injector, said cover including a conduit, for fluidly communicating fuel to said fuel chamber and to said fuel injector.

2. The assembly of claim 1, further comprising an engine head having a cavity that receives a portion of said air assist fuel injector.

3. The assembly of claim 1, said air assist fuel injector being a top-feed type fuel injector.

4. An assembly for an air assist fuel injection system, comprising:
    a rail configured to fluidly communicate pressurized gas to a fuel pressure regulator and to an air assist fuel injector; and
    a cover configured to fluidly communicate fuel to the fuel pressure regulator and to fluidly communicate fuel to the fuel injector.

5. The assembly of claim 4, said cover having at least one internal conduit configured to fluidly communicate fuel to the fuel pressure regulator and to the fuel injector.

6. The assembly of claim 5, said cover having another internal conduit for fluidly communicating fuel from a return of the fuel pressure regulator to a location external said cover.

7. The assembly of claim 4, said cover comprising:
    a first cavity configured to receive at least a portion of the fuel pressure regulator; and
    a second cavity configured to receive at least a portion of the fuel injector.

8. The assembly of claim 7, said cover having a fuel inlet.

9. The assembly of claim 8, said cover having at least one internal conduit that fluidly communicates fuel from said fuel inlet to said first cavity and to said second cavity.

10. The assembly of claim 9, said cover having a fuel outlet.

11. The assembly of claim 10, said cover having at least one another internal conduit that fluidly communicates fuel from the fuel pressure regulator to said fuel outlet.

12. The assembly of claim 7, in combination with said fuel pressure regulator and said fuel injector, said fuel pressure regulator having a fuel housing that defines a fuel chamber, said first cavity receiving said fuel housing.

13. The assembly of claim 12, further comprising a first seal member and a second seal member, said first cavity including a seat for said first seal member and another seat for said second seal member.

14. The assembly of claim 13, said first seal member abutting said fuel housing of said fuel pressure regulator.

15. The assembly of claim 14, said second seal member abutting said fuel pressure regulator.

16. The assembly of claim 12, said rail having a passageway that receives at least an outlet of said fuel injector and having a cavity that receives at least a portion of said fuel pressure regulator.

17. The assembly of claim 16, said rail including at least one internal conduit configured to fluidly communicate pressurized gas to said cavity of said rail.

18. The assembly of claim 17, said at least one internal conduit of said rail being configured to fluidly communicate pressurized gas to said passageway.

19. The assembly of claim 18, in combination with said air assists fuel injector, said rail having a passageway that receives at least an inlet of said air assist fuel injector.

20. An assembly comprising:
    an air assist fuel injector;
    a fuel pressure regulator;
    a rail having at least one conduit therein configured to fluidly communicate pressurized gas to said fuel pressure regulator and to said air assist fuel injector;
    a fuel injector; and
    a cover having at least one conduit therein configured to fluidly communicate fuel to said fuel injector and to said fuel pressure regulator.

21. The assembly of claim 20, said fuel injector being a top-feed type fuel injector.

22. The assembly of claim 20, said rail having a passageway that receives at least an inlet of said air assist fuel injector.

23. The assembly of claim 22, said passageway also receiving at least an outlet of said fuel injector.

24. The assembly of claim 23, said outlet of said fuel injector, said inlet of said air assist fuel injector, and an inlet of said fuel injector each being coaxial with respect to a longitudinal axis of said fuel injector.

25. The assembly of claim 24, said outlet of said fuel injector being located so as to feed fuel to said inlet of said air assist fuel injector.

26. The assembly of claim 20, said cover having a cavity that receives said fuel pressure regulator.

27. The assembly of claim 26, said cover having another cavity that receives said fuel injector.

28. The assembly of claim 20, said cover including a fuel inlet and a fuel outlet.

29. The assembly of claim 20, said cover being attached to said rail.

30. The assembly of claim 29, said cover being attached to said rail with at least one clip.

31. The assembly of claim 20, said cover and said rail being attached to an engine head.

32. The assembly of claim 20, said rail having a cavity that receives said fuel pressure regulator.

33. The assembly of claim 20, said fuel pressure regulator having a gas reference housing defining a gas reference chamber, said rail having a cavity that receives said gas reference housing.

34. The assembly of claim 20, said fuel pressure regulator including a gas reference chamber, a fuel chamber, and a diaphram located between said gas reference chamber and said fuel chamber.

35. The assembly of claim 20, said rail including a cavity that receives said fuel pressure regulator and a passageway that receives said air assist fuel injector, said conduit of said rail being in fluid communication with said cavity and said passageway.

36. A method, comprising:
supplying pressurized gas to a fuel pressure regulator and to an air assist fuel injector via at least one internal conduit of a rail; and
supplying fuel to the fuel pressure regulator via at least one internal conduit of a cover that receives the pressure regulator.

37. The method of claim 36, further comprising:
supplying fuel to a fuel inlet of the cover;
outputting fuel from a fuel output of the cover; and
supplying pressurized gas to a gas inlet of the rail.

38. The method of claim 36, said supplying fuel to the fuel pressure regulator comprising:
supplying fuel through the internal conduit of the cover to a cavity of the cover that receives the fuel pressure regulator.

39. The method of claim 36, further comprising:
supplying fuel to a fuel injector via the internal conduit of the cover.

40. The method of claim 39, said supplying fuel to the fuel injector comprising:
supplying fuel through the internal conduit of the cover to a cavity of the cover that receives the fuel injector.

41. The method of claim 36, said supplying pressurized gas to the fuel pressure regulator comprising:
supplying pressurized gas through the internal conduit of the rail to a cavity of the rail that receives the fuel pressure regulator.

42. The method of claim 36, said supplying pressurized gas to the air assist fuel injector comprising:
supplying pressurized gas through the internal conduit of the rail to a passageway of the rail that receives the air assist fuel injector.

43. The method of claim 36, further comprising defining a seal between the fuel pressure regulator and the rail.

44. The method of claim 36, further comprising defining a seal between the air assist fuel injector and the rail.

45. The method of claim 36, further comprising:
injecting fuel from a fuel injector into the air assist fuel injector.

46. The method of claim 45, further comprising:
injecting atomized fuel from the air assist fuel injector into a combustion chamber of an engine.

47. The method of claim 36, further comprising:
defining a seal between the cover and the fuel pressure regulator.

48. The method of claim 36, further comprising:
defining a seal between the cover and a fuel injector.

49. A method, comprising:
supplying pressurized gas to a fuel pressure regulator and to an air assist fuel injector via at least one internal conduit of a rail; and
supplying fuel to a fuel injector via at least one internal conduit of a cover that receives the fuel injector.

50. The method of claim 49, further comprising:
supplying fuel to a fuel inlet of the cover; and
supplying pressurized gas to a gas inlet of the rail.

51. The method of claim 49, said supplying fuel to the fuel injector comprising:
supplying fuel through the internal conduit of the cover to a cavity of the cover that receives the fuel injector.

52. The method of claim 49, said supplying pressurized gas to the air assist fuel injector comprising:
supplying pressurized gas through the internal conduit of the rail to a passageway of the rail that receives the air assist fuel injector.

53. A method comprising:
inserting an air assist fuel injector into an engine;
attaching an assembly to the engine, the assembly including a fuel injector and a fuel pressure regulator, the rail being configured to communicate pressurized gas to the fuel pressure regulator and the air assist fuel injector, the assembly further including a cover configured to communicate fuel to the fuel injector and to the fuel pressure regulator.

54. An assembly comprising:
a fuel pressure regulator;
a rail having internal conduit means for communicating pressurized gas to said fuel pressure regulator and to an air assist fuel injector; and
a cover having internal conduit means for communicating fuel to said fuel pressure regulator and to a fuel injector.

55. The assembly of claim 54, further comprising means for attaching said assembly to an engine.

56. A method, comprising:
retaining a pressure regulator in a cavity of a rail and a fuel injector in a passageway of the rail by covering the pressure regulator and the fuel injector with a cover configured to communicate fuel to the pressure regulator and the fuel injector, the pressure regulator for maintaining a pressure differential between a fuel supply and a gas supply for an air assist fuel injector.

57. An assembly, comprising:
a pressure regulator configured to maintain a pressure differential between a fuel supply and a gas supply, said pressure regulator having a fuel housing defining a fuel chamber and a gas reference chamber housing defining a gas reference chamber,
a rail configured to receive at least a portion of said gas reference housing and having an internal conduit configured to supply pressurized gas to said pressure regulator; and a cover attached to said rail and covering said pressure regulator, said cover having a first internal conduit configured to supply fuel to a fuel inlet of said pressure regulator, said cover having a second internal conduit configured to receive fuel from a fuel outlet of said pressure regulator.

58. An air assist fuel injection system comprising:

a fuel supply line;

a gas supply line;

a fuel pressure regulator;

a fuel injector;

an air assist fuel injector;

a rail configured to fluidly communicate gas from said gas supply line to said fuel pressure regulator and to said air assist fuel injector; and a cover configured to fluidly communicate fuel from said fuel supply line to said fuel pressure regulator and to said fuel injector.

* * * * *

UNITED STATES PATENT AND TRADEMARK OFFICE
CERTIFICATE OF CORRECTION

PATENT NO.    : 6,626,161 B2
DATED         : September 30, 2003
INVENTOR(S)   : Johnny Leung and Daryl Oran Codling It is certified that error appears in the above-identified patent and that said Letters Patent is hereby corrected as shown below:

<u>Column 8,</u>
Line 43, change "rail assembly 100" to -- rail 105 of the assembly 100. --.

Signed and Sealed this

Ninth Day of March, 2004

JON W. DUDAS
*Acting Director of the United States Patent and Trademark Office*